3,368,981
UTILIZATION OF SUPERACTIVE
CATALYTIC MATERIALS
Charles J. Plank, Woodbury, and Edward J. Rosinski,
Deptford, N.J., assignors to Mobil Oil Corporation, a
corporation of New York
No Drawing. Filed July 2, 1965, Ser. No. 469,320
4 Claims. (Cl. 252—455)

This invention has to do with compositions and methods for the more effective utilization of certain superactive catalytic materials useful in the conversion of hydrocarbons and in related reactions.

A massive industry has been built up around the use of catalysts in solid form for the conversion of hydrocarbons. The catalysts so used have been amorphous, acidic composites of silica and alumina, varying in proportion, and produced by coprecipitation, cogelation, and the like processes. These catalysts appear in various forms and sizes, appropriate to the several methods for their use which have been commercially adopted. Those produced by cogelation range in size from hard, durable beads of about ⅛-inch or more in diameter, utilized in moving bed operations, to "microspheres" which may be used in fluidized bed operations. Granular or pelleted materials of various sizes, ranging from those used in fixed bed or moving bed operations down to those of around 200 mesh size used in fluidized operations are common. Various clay products, treated and untreated, also enter into this spectrum of solid catalysts.

Recently there have been developed new classes of solid catalytic materials, having far more activity than those now conventional.

A most effective new class of catalytic materials is one based upon the activation of crystalline aluminosilicate materials.

A typical crystalline aluminosilicate material is the commercial faujasite known as 13X, having as a typical formula:

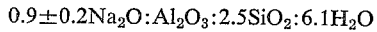
$$0.9\pm0.2Na_2O:Al_2O_3:2.5SiO_2:6.1H_2O$$

This is exemplary of the materials which are used in making the superactive catalytic materials above referred to. Another is the Y type faujasite known as "zeolite Y," a typical formula for which is:

$$0.9\pm0.2Na_2O:Al_2O_3:wSiO_2:xH_2O$$

in which formula "w" has a value greater than 3, up to about 6 and "x" may be a value up to about 9.

These and other crystalline aluminosilicate materials, both natural and synthetic, may be used in the formation of superactive catalytic materials. Among the preferred materials are those crystalline aluminosilicates having effective pore openings greater than about 5 A., such as zeolites A, L, T, erionite, faujasites of both X and Y types, chabazite, gmelinite, and mordenite.

The treatment of these crystalline aluminosilicates, starting materials, is based upon the substitution of other constituents for the alkali metal present in the "salt" form. This may be done by processes involving base exchange, acidification, or a combination of such processes. For example, a 13X faujasite may be treated with an aqueous solution of rare-earth chloride hexahydrates to an extent sufficient to achieve substantial removal of sodium, washed free of chlorine, dried and calcined. Or, the treating solution may contain both the rare earth chlorides and ammonium chloride, be carried to the same extent of sodium removal, followed by washing, drying, and calcining. In the first instance there is obtained a rare-earth crystalline aluminosilicate, and in the second, since the calcining drives off $NH_3$, there is obtained a rare-earth acid crystalline aluminosilicate. With 13X as the starting material, these may be referred to as REX and REHX. Similar preparations may be made with other aluminosilicates mentioned. A complete discussion of such preparations is set forth in United States Patent 3,140,253, C. J. Plank and E. J. Rosinski, of July 7, 1964.

The superactive aluminosilicates as prepared above, when initially prepared are, as a rule, possessed of activities too great for satisfactory use, and it is usual to adjust their activity by steaming or other treatment to arrive at more reasonable levels of activity.

Some chemically treated clays such as montmorillonite and some members of the kaolin family may be treated to possess a similar superactivity.

In other cases, with catalysts such as rare-earth erionite, or rare-earth acid erionite, a characteristic superactivity compared to silica alumina catalysts exists towards specific hydrocarbons, such as straight-chain hydrocarbons when the catalyst is the erionite compound. Such superactive, but size selective catalysts are also contemplated as being within the group of superactive catalysts.

There are also other materials, both crystalline and amorphous which we have found to possess superactivity as defined herein.

Superactivity may be defined as the capability of cracking gas oil, or effecting a similar hydrocarbon conversion, at a rate at least twice as great, and preferably three to five times as great, as the rate gotten by using an amorphous silica-alumina catalyst (having about 10% alumina), defined by the "Cat-A" test (Alexander and Shimp, National Petroleum News, vol. 36, pages R537–538, 1944), as having a 46AI, at the same temperature, pressure, and with the same length of exposure of catalyst to oil.

Hereinafter in this specification and in the claims appended hereto, the term "superactive catalysts" refers to and includes materials of the kind described above.

The materials mentioned are so much more active than conventionally used amorphous silica alumina catalysts that they may be used in far smaller amounts, proportional to the oil or other hydrocarbon being converted, than is now customary.

It is to this problem that the present invention is directed.

In application Ser. No. 359,484, filed April 13, 1964, now Patent No. 3,194,754 such materials, as very fine particulate powders, are introduced to particular processes, utilizing larger catalytic particles. The superactive materials, adhering to a great extent because of their very small size, are used to modify the process conducted.

This invention is directed to the preparation of adherent layers of the superactive materials, sufficient in amount to be catalytically effective, adherent enough to withstand the usual methods of handling in commerce and in process, upon desirable supports, catalytic and inert, porous and non-porous.

To this end there is used a third ingredient to act as an adhesion agent and which may also act as an agent to minimize attrition, and sometimes a fourth, protective, ingredient, and a method of treatment hereinafter explained in detail, but which may be described shortly as tumbling together the support, the catalyst, and the adhesion agent.

As support there may be used any particulate material appropriate in size for the process in which the preparation will be used. Among those materials which may be used there may be mentioned silica alumina bead form catalysts, both active and spent, particle form catalysts which are composites of silica alumina and superactive crystalline alluminosilicates, similar materials which have been utilized in commercial cracking until they have reached a lower value of activity, other siliceous and alumina-containing materials, catalytic, fresh or spent, or inert, silica-alumina complexes which have little catalytic value but are useful as dessicants, glass beads of appropriate size, various clay materials both catalytic and non-catalytic, and the like. Clay materials, as shaped pellets of various sizes as well as in granular particle sizes, ranging from the large pellets and particles used in various fixed bed and moving bed processes down to the powders of 200 mesh size and less used in fluidized processes are contemplated. As noted, the support may be porous or non-porous, and there may be used silica granules and particles, quartz granules, ceramic materials such as granules and particles of firebrick, various burned clays, and the like. There may also be used pumice, blast furnace slag, and similar materials in appropriate form.

The adhesion agent employed to secure a competent coating of the superactive catalyst to the support also may act to protect the catalyst material from the attrition encountered in systems such as moving bed and fluidized bed reactors and regenerators, and therefore is possessed of a function which may be termed lubricant. In further discussion such adhesion or adhesion-lubricant agents are spoken of as binders.

As binders there may be employed a very considerable variety of substances. There may be used barytes, clays of various sorts, talc, some alkaline earth compounds, boric acid, silica, rare earth oxides, some salts such as alkaline earth phosphates, metals which fuse or soften within the temperature range at which the catalysts are stable, such as aluminum and the like.

As a further feature of this invention there may be included a protective material of granular size appropriate to protect the catalyst deposit from abrasive contact with solid particles which will occur in many processes. These may be similarly bound to the support. As such protective materials there may be used particles of high melting point materials, such as stainless steel, or particles of high melting ceramic materials.

The coating may be gotten by tumbling the support, the catalyst, the binder, and, if used, the protective material for a sufficient time to secure adequate coating. The temperature to be used is somewhat dependent upon the material to be used as a binder. For example, with barium sulphate, a temperature of around 1000° F. is useful, and similar temperature levels are useful for the various clays and claylike materials which may be used, as well as for aluminum metal. In general, the temperature must be one below that at which the binder material decomposes, if it be unstable at high temperatures. If the binder be a fusible material, a temperature of the same order as its fusing temperature is indicated, and such temperature may be at, or above, somewhat, or somewhat below the fusing temperature. If the chemical nature of the binder be such as to act as a flux for the support or the catalyst, fluxing temperature should be avoided. With adequate tumbling, temperatures much lower than those indicated frequently may be used.

The particle size of the particulate superactive catalyst and of the binder material should be of the order of substantially all through 270 U.S. Standard mesh, and preferably substantially all through 325 mesh. (325 mesh is about 40 microns. Aluminosilicates are usually of satisfactory size as made, the crystallites being normally around 10 microns or less in size, and even below 1 micron, although in preparation agglomerates of crystallites may form, which can be easily broken up in screening. Dependent upon the kind and orgin of the binder, it will usually require reduction in size and screening. The protective material, when used, should also be of appropriate size.

*Experiment 1*

In this experiment, a Y type faujasite aluminosilicate, base exchanged with a solution of mixed rare earth hexa-chlorides to such an extent that there was remaining 1.0% (wt). of sodium, then washed free of chloride and dried at 230° F. for a period of 20 hours was used. The support was a conventional amorphous silica alumina bead catalyst, and no binder was used. Both the blank support and the support tumbled with the catalyst were subjected to steaming for a period of 24 hours, 15 p.s.i.g, 100% steam, before being subjected to a cracking test. The tumbling with catalyst was continued over a weekend, after which coated beads were separated from fines and subjected to cracking. The experiment is summarized in the following:

TABLE I

|  | Blank | Coated |
|---|---|---|
| Carrier Particle Type | Bead Si/Al | Bead Si/Al. |
| Coating Type | None | REY(dried). |
| Coating Method |  | Tumbling. |
| Time |  | Over weekend. |
| Temperature |  | Room. |
| Amount of Coating [1] | None | 0.28 wt. percent. |
| Catalytic Evaluation: |  |  |
| Space Velocity (LHSV) | 4 | 4. |
| Cat/oil (v./v.) | 1.5 | 1.5. |
| Temperature, deg. F | 900 | 900. |
| Conversion (vol. percent) | 30.1 | 39.4. |
| C5+ Gasoline (vol. percent) | 24.9 | 33.7. |
| Total C4's (vol. percent) | 6.5 | 8.4. |
| Dry Gas (wt. percent) | 3.4 | 3.8. |
| Coke (wt. percent) | 1.3 | 1.1. |
| Delta Advantage over Si/Al:[2] |  |  |
| C5+ Gasoline (vol. percent) | −0.3 | +3.3. |
| Total C4's (vol. percent) | +0.1 | −0.8. |
| Dry Gas (wt. percent) | +0.1 | −1.1. |
| Coke (wt. percent) | +0.3 | −0.8. |

[1] Determined by gain in weight.
[2] Delta Advantage over Si/Al.—This indicates deviation from a selected standard amorphous silica alumina catalyst at the indicated conversion level, and is for purposes of general comparison. In the above, the coated beads, at 39.4 conversion, made 3.3% more gasoline than would the standard at the same conversion.

It is to be noted that although the deposits of fine superactive catalyst was very small, there was still enough of it clinging to the beads to cause a very significant increase in conversion, and that increase in conversion was of the type of conversion accomplished by the superactive crystalline aluminosilicate, as evidenced by the nature of the product distribution with significant increase in gasoline accompanied by decrease in gaseous products and coke.

It will also be noted that the data of this experiment relate to application Serial No. 359,484, now Patent No. 3,194,754 previously mentioned, showing that even a small coating of superactive catalyst can be of effect, and can be gotten in the absence of binders, although the amount that can be achieved is quite small, and the tumbling prolonged in time.

*Experiment 2*

This experiment is designed to show the effect of a binder, of time of tumbling, and temperature of tumbling. In this experiment, the same superactive crystalline alumino-silicate catalyst and the same kind of support were used as in Experiment 1, and therefore the "blank" is the same. One batch of the bead support was tumbled with the catalyst and a binder of barytes over a weekend at room temperature, while a second batch of support, catalyst, and binder was tumbled for 2 hours at a temperature of 1150° F. Prior to catalytic evaluation the tumbled batches were separated from excess fines and both, as well as the blank, were subjected to treatment with steam for a period of 24 hours, 15 p.s.i.g., 100% steam, at 1200° F. The results are shown in Table II.

Comparison of the results of Column 2 of Table II with Column 2 of Table I clearly demonstrates the better results when using a binder.

In Table I, and in Column 2 of this table, the amount of coating was determined by gain in weight after freeing from unattached fine material. In Column 3, this table, the amount of coating was determined by washing, in which a 5 gm. sample was washed with 20 ml. of water for at least 4 hours with gentle agitation, followed by separation, drying, and calcining the separated fines.

was used. ("Equilibrium" indicates that it had been subjected to cyclic cracking and regeneration until its activ-

TABLE II

|  | Blank | Cold Tumbled | Hot Tumbled |
|---|---|---|---|
| Carrier Particle: |  |  |  |
| Type | Bead | Bead | Bead. |
| Composition | Si/Al | Si/Al | Si/Al. |
| Wt. gms |  | 181 | 181. |
| Coating: |  |  |  |
| Catalyst: |  |  |  |
| Type |  | REY (dried) | REY (dried). |
| Wt. gms |  | 25 | 25. |
| Binder |  | Barytes | Barytes. |
| Wt. gms |  | 25 | 25. |
| Method |  | Tumbling | Tumbling. |
| Time |  | Over weekend | 2 hours. |
| Temperature |  | Room | 1,150° F. |
| Coating Amount: |  |  |  |
| Catalyst (wt. percent) | None | 0.45 | 3.03. |
| Binder (wt. percent) |  |  | 3.03. |
| Catalytic Evaluation: |  |  |  |
| Space Velocity (LHSV) | 4 | 4 | 4. |
| Cat/Oil (v./v.) | 1.5 | 1.5 | 1.5. |
| Temperature, deg. F | 900 | 900 | 900. |
| Conversion (vol. percent) | 30.1 | 44.4 | 50.6. |
| $C_5+$ Gasoline (vol. percent) | 24.9 | 38.7 | 44.8. |
| Total $C_4$'s (vol. percent) | 6.5 | 8.8 | 9.6. |
| Dry Gas (wt. percent) | 3.4 | 4.0 | 4.3. |
| Coke (wt. percent) | 1.3 | 1.0 | 1.0. |
| Delta Advantage over Si/Al: |  |  |  |
| $C_5+$ Gasoline (vol. percent) | −0.3 | +5.3 | +7.6. |
| Total $C_4$'s (vol. percent) | +0.1 | −2.0 | −3.3. |
| Dry Gas (wt. percent) | +0.1 | −1.6 | −2.2. |
| Coke (wt. percent) | +0.3 | −1.4 | −2.1. |

From the data of Table II the effects of tumbling at high temperature for a much shorter time, in the presence of a binder are immediately evident. Even for a longer time and at room temperature, the presence of a binder permitted a coating that enabled the production of about 50% more of the useful product, gasoline, while the hot tumbling permitted an increase in gasoline production of approximately 80%. Thus, the presence of a binder is shown to be effective at both high temperatures and low temperatures of tumbling.

*Experiment 3*

In this experiment an "equilibrium" commercial silica alumina bead, containing a small amount of chromia, ity had been reduced to a reasonably settled value.) The superactive catalyst was a Y type faujasite material which had been base exchanged with a solution of a mixture of rare earth chloride hexahydrates until the sodium content of the aluminosilicate had been reduced to 1.0% (wt.), followed by washing to remove chloride, dried for 20 hours at 230° F., steamed for 24 hours, 15 p.s.i.g., 1200° F., 100% steam, and then calcined at 1000° F. (The steaming treatment prior to calcining is coded in the tables as PSR24.)

The binder used was powdered metallic aluminum.

The data of this experiment are shown in Table III, and from consideration of this data it is quite evident

TABLE III

|  | Blank | Column | | | |
|---|---|---|---|---|---|
|  |  | 1 | 2 | 3 | 4 |
| Carrier Particle: |  |  |  |  |  |
| Type | Bead | Bead | Bead | Bead | Bead. |
| Composition | Si/Al/Cr |  |  |  |  |
| Wt. gms |  | 217.3 | 217.3 | 235.7 | 235.7 |
| Coating: |  |  |  |  |  |
| Catalyst |  | REY | REY | REY | REY. |
| Type |  | PSR24 | PSR24 | PSR24 | PSR24. |
| Wt. gms |  | 10 | 10 | 2.5 | 1.25. |
| Binder: |  |  |  |  |  |
| Type |  | Al | Al | Al | Al. |
| Wt. gms |  | 5 | 5 | 0.6 | 0.6. |
| Method (tumble): |  |  |  |  |  |
| Time, hours |  | 16-18 | 16-18 | 1 | 1. |
| Temp., deg. F |  | 1,150 | 1,250 | 1,350 | 1,350. |
| Coating Amount: |  |  |  |  |  |
| Catalyst, wt., percent | None | 3.03 | 4.57 | 0.92 | 0.50. |
| Binder, wt., percent | None | 1.52 | 2.28 | 0.25 | 0.26. |
| Catalytic Evaluation: |  |  |  |  |  |
| Space Velocity (LHSV) | 2 | 2 | 2 | 2 | 2. |
| Cat/Oil (v./v.) | 3 | 3 | 3 | 3 | 3. |
| Temp., deg. F | 900 | 900 | 900 | 900 | 900. |
| Conversion | 45.2 | 64.1 | 60.8 | 56.6 | 53.3. |
| $C_5+$ Gasoline (vol. percent) | 32.6 | 53.9 | 50.6 | 46.8 | 42.9. |
| Total $C_4$'s (vol. percent) | 11.8 | 12.5 | 12.4 | 12.3 | 12.1. |
| Dry Gas (wt. percent) | 5.9 | 5.7 | 5.8 | 5.0 | 5.4. |
| Coke (wt. percent) | 3.2 | 2.5 | 2.5 | 2.5 | 2.4. |
| Delta Advantage over Si/Al: |  |  |  |  |  |
| $C_5+$ Gaso. (vol. percent) | −1.3 | +9.4 | +7.7 | +6.1 | +4.1. |
| Total $C_4$'s (vol. percent) | +0.7 | −5.4 | −4.0 | −2.7 | −1.7. |
| Dry gas (wt. percent) | +0.2 | −2.7 | −2.1 | −2.3 | −1.5. |
| Coke (wt. percent) | +0.7 | −2.6 | −2.1 | −1.4 | −1.0. | that metallic aluminum is an efficient binder, below, near, and above its melting point of 1220° F. It is also quite evident from the nature of the product distribution in the various runs that the additional conversion partakes of the nature of conversion produced by the superactive aluminosilicate catalyst, even with the very minor amount of coating obtained by the rather sparse treatment in the fourth column.

Amount of coating was determined by weight gain.

sive, the carriers were silica alumina bead catalysts of conventional type. In Experiments 10 and 11, a bead of the same type, containing some chromia, of "equilibrium" activity, as explained in Experiment 3, was used. In Experiments 5, 6, 7a, 7b, 8, and 9, the catalyst-coated carriers were steamed 24 hours, 15 p.s.i.g., 1200° F., 100% steam, (PSR24), as were the blanks of Experiments 4 and 5.

Amount of coating determined by weight gain.

TABLE IV

| | Blank | | | Experiment 7 | | | | | | |
|---|---|---|---|---|---|---|---|---|---|---|
| | 4 | 5 | 6 | a | b | c | 8 | 9 | 10 | 11 |
| Carrier Particle: | | | | | | | | | | |
| Type | Bead | Bead | Bead | Bead | Bead | Bead | Bead | Bead | Bead | Bead | Bead. |
| Composition | Si/Al | Si/Al | Si/Al | Si/Al | Si/Al | Si/Al | Si/Al | Si/Al | Si/Al | Si/Al/Cr | Si/Al/Cr. |
| Wt. gms | | 181 | | 181 | 181 | 201.6 | 201.6 | 201.6 | 217.3 | 181 | 235.7 | 235.7. |
| Coating: | | | | | | | | | | | |
| Catalyst | None | REY | None | REY | REY | REY | REY | REY | REY | REY | REY | REY. |
| Type | | Dried | | Calc. | Calc. | Calc. | Calc. | PSR24 | Calc. | Calc. | PSR24 | PSR24. |
| Wt. gms | None | 25 | None | 5 | 25 | 5 | 5 | 5 | 5 | 5 | 2.5 | 2.5. |
| Binder: | | | | | | | | | | | |
| Type | | Ca(OH)$_2$ | | CaCO$_3$ | (RE)$_2$O$_3$ | SiO$_2$[1] | SiO$_2$[2] | SiO$_2$[3] | ZrO$_2$[4] | ZrOCl$_2$[5] | H$_3$BO$_4$ | Clay. |
| Wt. gms | | 25 | | 5 | 12 | | | 5 | 5 | 5 | 1.25 | 1.25. |
| Method | | Tumble | | Tumble | Tumble | | | Tumble | | | ([6]) | Tumble. |
| Time | | 2 hrs | | 2 hrs | 2 hrs | 1 hr | 1 hr | 1 hr | 1 hr | 1 hr | 1 hr | 1 hr. |
| Temp., deg. F. | | 1,150 | | 1,150 | 1,200 | 1,150 | 1,150 | 1,150 | 1,150 | 1,150 | 1,250 | 1,250. |
| Coating Amount: | | | | | | | | | | | |
| Catalyst, wt. percent. | None | 4.5 | None | 1.0 | 0.58 | 1.19 | 2.01 | 0.72 | 1.3 | 0.63 | 0.48 | 0.24. |
| Binder, wt. percent | | 4.5 | | .99 | 0.30 | Not determined | | | 1.3 | 0.64 | 0.25 | 0.14. |
| Catalytic Evaluation: | | | | | | | | | | | |
| Space Velocity (LHSV). | 4 | 4 | 2 | 2 | 2 | 2 | 2 | 2 | 2 | 2 | 2 | 2. |
| Cat/Oil (v./v.) | 1.5 | 1.5 | 3 | 3 | 3 | 3 | 3 | 3 | 3 | 3 | 3 | 3. |
| Temp., deg. F | 900 | 900 | 900 | 900 | 900 | 900 | 900 | 900 | 900 | 900 | 900 | 900. |
| Conversion | 30.1 | 31.7 | 44.3 | 59.9 | 65.7 | 58.9 | 59.9 | 52.4 | 61.3 | 62.5 | 54.7 | 56.0. |
| C$_5$+Gasoline (vol. percent). | 24.9 | 26.3 | 33.4 | 48.5 | 54.4 | 48.7 | 49.9 | 43.6 | 51.5 | 51.5 | 45.3 | 44.5. |
| Total C$_4$'s (vol. percent). | 6.5 | 6.7 | 11.7 | 14.1 | 14.6 | 12.8 | 13.0 | 10.9 | 12.6 | 14.5 | 12.2 | 13.2. |
| Dry Gas (wt. percent). | 3.4 | 3.6 | 5.5 | 5.7 | 6.2 | 5.7 | 5.7 | 5.3 | 5.8 | 6.2 | 5.5 | 5.9. |
| Coke (wt. percent). | 1.3 | 1.2 | 1.9 | 2.5 | 2.0 | 1.9 | 1.6 | 2.1 | 2.0 | 1.6 | 2.2 | 2.3. |
| Delta Advantage over Si/Al: | | | | | | | | | | | |
| C$_5$+Gasoline (vol. percent). | −0.3 | +1.1 | 0.0 | +6.1 | +9.2 | +7.8 | +7.5 | +5.4 | +8.4 | +7.8 | +5.7 | +4.1. |
| Total C$_4$'s (vol. percent). | +0.1 | +0.3 | −0.9 | −2.0 | −3.6 | −3.0 | −3.1 | −2.6 | −4.0 | −2.5 | −2.1 | −1.6. |
| Dry Gas (wt. percent). | +0.1 | +0.3 | −0.1 | −2.1 | −2.5 | −2.0 | −2.1 | −1.4 | −2.2 | −2.0 | −1.6 | −1.4. |
| Coke (wt. percent). | +0.3 | +0.2 | −0.5 | −1.9 | −3.4 | −2.4 | −2.8 | −1.2 | −2.7 | −3.3 | −1.4 | −1.5. |

[1] SiO$_2$ as organosilicate, 45.44% SiO$_2$, 2% wt. based on REY, apply as slurry dry and tumble.
[2] 30% SiO$_2$ in water, 1% based on REY, coat add REY, dry and tumble.
[3] Fines.
[4] ZrO$_2$ in solution, coat, dry add REY, tumble.
[5] ZrOCl$_2$:8H$_2$O first, dry, add REY and tumble.
[6] 15 minutes tumbling at low temp. before high temp. tumble.

*Experiments 4 to 11, inclusive*

These experiments show the effectiveness of various binder materials. In Experiment 4, the catalyst was a rare-earth exchanged Y type faujasite, as previously described, washed free of chloride and dried, but not steamed. In Experiments 5, 6, 7, and 9 the catalyst was the same material, calcined at 1000° F. for 10 hours after drying. In Experiments 7c, 10, and 11 the catalyst was the same rare-earth exchanged Y type faujasite, washed, dried, and steam treated for 24 hours, 15 p.s.i.g., 1200° F., 100% steam, (PSR24). In Experiments 4 to 9 inclu-

*Experiments 12, 13, 14*

These experiments show the use of various carrier particles. In all cases the catalyst is a rare-earth exchanged Y type faujasite, as previously described, washed free of chloride, dried, and then steam treated, 24 hours, 15 p.s.i.g., 1200° F., 100% steam. In Experiment 12, the support is a calcined raw clay pellet possessing some catalytic activity. In Experiment 13, the carrier is a silica alumina dessiccant bead, of the type sold commercially as "Sorbead," possessing a quite limited amount of catalytic activity, which had been steamed 24 hours, 15 p.s.i.g., 1200° F., 100% steam, before coating. In Experiment 14 the carrier is an inert glass bead, and it is interesting to note the activity of the extremely small amount of the catalyst coated upon this smooth bead.

Amount of coatings were determined by weight gain.

TABLE V

| | Experiment | | |
|---|---|---|---|
| | 12 | 13 | 14 |
| Carrier Particle: | | | |
| Type | Clay | "Sorbead." | Glass. |
| Composition | Raw | Steamed | |
| Wt. gms | 225.7 | 217.3 | |
| Coating: | | | |
| Catalyst | REY | REY | REY. |
| Type | PSR24 | PSR24 | PSR24. |
| Wt. gms | 10 | 5 | |
| Binder: | | | |
| Type | BaSO4 | ZrO2[1] | Al. |
| Wt. gms | 10 | 5 | |
| Method | Tumble | Tumble | Tumble. |
| Time | 1 hr | 1 hr | |
| Temp., deg. F | 1,150 | 1,150 | |
| Coating Amount: | | | |
| Catalyst, wt percent | 2.97 | 1.13 | 0.5.[2] |
| Binder, wt. percent | 2.97 | 1.13 | |
| Catalytic Evaluation: | | | |
| Space Velocity (LHSV) | 2 | 2 | |
| Cat/Oil (v./v.) | 3 | 3 | |
| Temp., deg. F | 900 | 900 | |
| Conversion | 64.4 | 35.4 | 19.1. |
| C5+Gasoline (vol. percent) | 53.8 | 30.3 | 16.4. |
| Total C4's (vol. percent) | 12.4 | 6.2 | 1.6. |
| Dry Gas (wt. percent) | 5.8 | 3.3 | 1.0. |
| Coke (wt. percent) | 3.1 | 1.6 | 0.1. |
| Delta Advantage over Si/Al: | | | |
| C5+Gasoline (vol. percent) | +9.1 | +2.4 | |
| Total C4's (vol. percent) | −5.1 | −1.6 | |
| Dry Gas (wt. percent) | −2.7 | −1.0 | |
| Coke (wt. percent) | −2.1 | −0.1 | |

[1] The catalyst, dry, was mixed with the carrier, then a solution containing 5 gms. ZrO2 was added, followed by tumbling.
[2] Approx.

*Experiment 15*

This experiment shows the ability to coat small carrier particles of the type used in fluidized catalytic cracking.

The carrier was a conventional commercial catalyst for fluid cracking, a silica alumina composite having 13.0 wt. percent of $Al_2O_3$, amorphous, and not calcined, this being the normal condition in which fresh catalyst is added to the FCC operation. The catalyst was the rare earth exchanged Y type faujasite which has been previously described, which had been washed, dried, and steamed 24 hours, 15 p.s.i.g., 1200° F., 100% steam, (PSR24). The binder was metallic aluminum powder. Both binder and catalyst were of a size to pass through 325 mesh screen (U.S.S.). The carrier, catalyst and binder were rolled together for 1 hour at a temperature of 1250° F., and then the mixture was screened upon a 325 mesh screen. The portion remaining upon the screen (about 80%), was catalytically evaluated. In order to so evaluate in comparison with the other experiments herein reported, this material was pelleted before being so tested. To correct for the "green" condition of the fluid catalyst carrier, one batch of pellets was calcined for 10 hours at 1000° F., and another batch was steamed for 24 hours, 15 p.s.i.g., 1200° F., 100% steam.

TABLE VI

| | | Blank | | |
|---|---|---|---|---|
| Carrier Particle: | | | | |
| Type | | Fluid | Fluid | Fluid. |
| Composition | | Si/Al | Si/Al | Si/Al. |
| Wt. gms | | | 150 | 150. |
| Coating: | | | | |
| Catalyst | | None | REY | REY. |
| Type | | | PSR24 | PXR24. |
| Wt. gms | | | 2.5 | 2.5. |
| Binder: | | | | |
| Type | | | Al[1] | |
| Wt. gms | | | 1.25 | 1.25. |
| Method | | | Tumble | Tumble. |
| Time | | | 1 hr | 1 hr. |
| Temp., deg. F | | | 1,250 | 1,250. |

A single preparation, then divided

| | | Batch 1, calcined | Batch 2, steamed |
|---|---|---|---|
| Treatment | PSR24 | | |
| Catalytic Evaluation: | | | |
| Space Velocity (LHSV) | 2 | 2 | 2. |
| Cat/Oil (v./v.) | 3 | 3 | 3. |
| Temp., deg. F | 900 | 900 | 900. |
| Conversion | 46.1 | 62.5 | 59.7. |
| C5+ gasoline (vol. percent) | 34.6 | 48.2 | 47.3. |
| Total C4's (vol. percent) | 11.6 | 18.9 | 15.1. |
| Dry Gas (wt. percent) | 5.6 | 8.4 | 6.5. |
| Coke (wt. percent) | 2.7 | 4.3 | 1.9. |
| Delta Advantage over Si/Al: | | | |
| C5+ Gasoline (vol. percent) | +0.1 | +1.5 | +5.0. |
| Total C4's (vol. percent) | +0.2 | +0.1 | −1.0. |
| Dry Gas (wt. percent) | +0.2 | +0.5 | −1.3. |
| Coke (wt. percent) | +0.2 | −1.5 | −2.5. |

[1] Powder.

*Experiment 16*

This experiment shows the use of mixtures of binder materials. In all cases the carrier particle is the amorphous silica alumina bead catalyst with a small amount of chromia earlier described. The catalyst used is the rare-earth exchanged Y type faujasite previously described, washed, dried, steam treated 24 hours, 15 p.s.i.g., 1200° F., 100% steam, (PSR24). The binder mix was aluminum metal powder and clay in one test, and aluminum metal powder, clay, and the commercial "molecular sieve" CaA (calcium form of "A" aluminosilicate). The coating method was vigorous mixing for a period of 15 minutes at low temperature, followed by tumbling for one hour at 1150° F.

The data for this experiment are set forth in Table VII. In examining this table, we not only have the multiple binder effect, but in the use of the CaA material we have an example of the effect of utilizing two catalytic materials of differing capabilities. The large pore REY material will accept hydrocarbon molecules of practically all sizes present in the gas oil charged. The CaA material of limited pore size, about 5 A., will accept only straight chain hydrocarbon molecules. The effect of this is shown in the greater selectivity (ratio of gasoline to total conversion), shown in the column where the very slight amount of CaA is present in the binder mix.

Amount of coating determined by weight gain.

TABLE VII

| | | Blank | | |
|---|---|---|---|---|
| Carrier Particle | | Bead | Bead | Bead. |
| Composition | | Si/Al | Si/Al | Si/Al. |
| Wt. gms | | | 235.7 | 235.7. |
| Coating: | | | | |
| Catalyst | | None | REY | REY. |
| Type | | | PSR24 | PSR24. |
| Wt. gms | | | 1.25 | 1.25. |
| Binder: | | | | |
| Type | | | Al | Al. |
| Wt. gms | | | 0.6 | 0.6. |
| Type | | | Clay | Clay. |
| Wt. gms | | | 0.6 | 0.6. |
| Type | | | | CaA.[1] |
| Wt. gms | | | | 0.6. |
| Method | | | Tumble | Tumble. |
| Time | | | 1 hr | 1 hr. |
| Temp. deg. F | | | 1,150 | 1,150. |

[1] CaA added in premix after other binders.

TABLE VII—Continued

| | | | Blank |
|---|---|---|---|
| Coating Amount: Catalyst, wt. percent | | 0.32 | 0.77 |
| Catalytic Evaluation: | | | |
| Space Velocity (LHSV) | 2 | 2 | 2 |
| Cat/Oil (v./v.) | 3 | 3 | 3 |
| Temp., deg. F | 900 | 900 | 900 |
| Conversion | 45.2 | 51.4 | 49.6 |
| C₅+ gasoline (vol. percent) | 32.6 | 39.5 | 38.8 |
| Total C₄'s (vol. percent) | 11.8 | 12.8 | 12.3 |
| Dry Gas (wt. percent) | 5.9 | 5.7 | 5.7 |
| Coke (wt. percent) | 3.2 | 3.1 | 2.3 |
| Delta Advantage over Si/Al: | | | |
| C₅+ gasoline (vol. percent) | −1.3 | +1.4 | +2.2 |
| Total C₄'s (vol. percent) | +0.7 | −0.4 | −0.3 |
| Dry Gas (wt. percent) | +0.7 | −0.9 | −0.6 |
| Coke (wt. percent) | +0.7 | −0.1 | −0.7 |

Experiment 17

This experiment demonstrates the use of the technique here disclosed in the rejuvenation of an equilibrium catalyst already containing a superactive ingredient.

The carrier particles were an equilibrium "D5" type catalyst, that is, a composite catalyst bead of amorphous silica alumina as a matrix, containing about 7 wt. percent of a rare earth exchanged X type faujasite, which catalyst had been subjected to alternate reaction and regeneration in commercial processing until its activity had decreased to a reasonably constant level.

The catalyst was a Y type faujasite which had been treated with a solution containing 5 wt. percent of mixed rare earth hexachlorides and 2 wt. percent of ammonium chloride, at 180° F. until the sodium content of the faujasite was reduced to 2 wt. percent, washed free of chloride, dried, and calcined for 10 hours at 1000° F., giving a rare-earth acid crystalline aluminosilicate, which is designated as REHY.

The binder was barytes.

It is noted that in the preparation of the above catalyst, the final step was a calcining. While the calcination was more prolonged than necessary to merely remove ammonium ion, and of such extent as to involve an activity adjustment, attention is called to the fact that where a final step in the preparation of the catalyst is heating, this step can be combined with the coating operation.

The data of this experiment are shown in Table VIII. Amount of coating determined by washing, etc.

TABLE VIII

| | | Blank |
|---|---|---|
| Carrier Particle: | | |
| Type | Bead | Bead |
| Composition | "DB5" | "DB5" |
| Wt. gms | | 240.6 |
| Coating: | | |
| Catalyst | | REHY |
| Type | | Calcined |
| Wt. gms | | 5 |
| Binder: | | |
| Type | | BaSO₄ |
| Wt. gms | | 2.5 |
| Method | | Tumble |
| Premix | | 15 min.[1] |
| Time | | 1 hr. |
| Temp., deg. F | | 1,250 |
| Coating Amount: | | |
| Catalyst (wt. percent) | None | 2.38 |
| Binder (wt. percent) | | 1.19 |
| Catalytic Evaluation: | | |
| Space Velocity (LHSV) | 4 | 4 |
| Cat/Oil (v./v.) | 1.5 | 1.5 |
| Temp. deg. F | 900 | 900 |
| Conversion | 34.2 | 48.5 |
| C₅+ Gasoline (vol. percent) | 29.5 | 42.0 |
| Total C₄'s (vol. percent) | 6.4 | 10.0 |
| Dry Gas (wt. percent) | 3.3 | 4.4 |
| Coke (wt. percent) | 1.4 | 1.1 |
| Delta Advantage over Si/Al: | | |
| C₅+ gasoline (vol. percent) | +2.2 | +6.1 |
| Total C₄'s (vol. percent) | −1.0 | −2.2 |
| Dry Gas (wt. percent) | −0.9 | −2.2 |
| Coke (wt. percent) | 0.0 | −1.7 |

[1] Low temp.

Experiment 18

This experiment examines the effect upon selectivity and octane number of the coating when associated with a catalytic carrier particle.

The carrier particles used in this experiment were the equilibrium bead catalyst composite of amorphous silica alumina and 7 wt. percent of rare earth exchanged X type faujasite. These carrier particles had been subjected to alternate reaction and regeneration in commercial use until their activity had become reasonably well settled.

Three types of catalytic material were used in coating. One was a rare earth exchanged X type faujasite, REX, as previously described herein, and the second was a rare earth exchanged Y type faujasite, REY, also as previously described herein. These were steam treated 24 hours, 15 p.s.i.g., 1200° F., 100% steam (PSR24). The third was a Y type faujasite which had been exchanged with ammonium chloride, washed, dried, and calcined for 10 hours at 1000° F. This is designated as HYT10–1000.

Examination of the data, Table IX, shows that the octane number of the product was essentially the same in all runs, but that the coated materials not only gave more gasoline, but that the selectivity (ratio of gasoline to total conversion), was substantially increased.

Amount of coating determined by washing, etc.

TABLE IX

| | Blank | | | |
|---|---|---|---|---|
| Carrier Particle | Bead | Bead | Bead | Bead |
| Type | | D5, equilibrium | | |
| Coating: | | | | |
| Catalyst | None | REX | REY | HY |
| Type | | PSR24 | PSR24 | T10-1000 |
| Wt. percent | | 1.61 | 0.81 | 1.65 |
| Binder | | Al | Al | Al |
| Catalytic Evaluation: | | | | |
| Space Velocity (LHSV) | 2 | 2 | 2 | 2 |
| Cat/Oil (v./v.) | 3 | 3 | 3 | 3 |
| Temp., deg. F | 898 | 900 | 897 | 897 |
| Conversion | 55.5 | 58.6 | 62.1 | 64.4 |
| C₅+ Gasoline (vol. percent) | 43.0 | 45.9 | 49.3 | 50.8 |
| Total C₄'s (vol. percent) | 13.9 | 13.6 | 14.6 | 15.1 |
| Dry Gas (wt. percent) | 6.4 | 6.4 | 6.4 | 6.5 |
| Coke (wt. percent) | 2.6 | 3.2 | 3.0 | 3.2 |
| Octane Number:[1] R+3 | 98.0 | 97.9 | 98.0 | 97.9 |

[1] Octane number determination, Research method plus 3 cc. lead, taken on C₅+ Gasoline, C₄ free.

Experiment 19

In this experiment the carrier was a pelletted clay catalyst of a type sold commercially for use in catalytic cracking.

The catalyst component used in coating was a rare earth exchanged Y type faujasite, as previously described, which after exchange had been washed free of chloride, dried, and steamed 24 hours, 15 p.s.i.g., 1200° F., 100% steam (PSR24).

The binder used was barytes.

The data is shown in Table X.

Examination of the data of this table will show a very substantial increase in the conversion capability of the catalyst, amounting to about a 55% increase in gasoline production, accompanied by a greater selectivity, or ratio of gasoline produced to total conversion.

a considerable amount of control of the activity of the coated catalyst can be gotten.

In this experiment, the carrier particles were the "D5" equilibrium bead catalyst described earlier herein.

The catalyst was an X type faujasite which had been exchanged with a solution of rare earth chlorides, washed free of chloride, dried, and steamed 24 hours, 15 p.s.i.g., 1200° F., 100% steam (PSR24).

The binder was powdered aluminum metal.

It will be noted from the data, in Table XI, that each cycle of coating resulted in an increase in the amount of coating.

In an extension of this experiment, the same carrier and binder were used with a rare earth exchanged Y type faujasite which had been washed, dried, and steam treated 24 hours, 15 p.s.i.g., 1200° F., 100% steam (PSR24).

Amount of coating determined by washing, etc.

TABLE XI

|  |  |  |  |  | Blank |  |  |
|---|---|---|---|---|---|---|---|
| Carrier Particle |  |  |  |  |  |  |  |
| Type | Bead | Bead | Bead | Bead | Bead | Bead | Bead. |
| Composition | Equilibrium | Equilibrium | Equilibrium | Equilibrium | Equilibrium | Equilibrium | Equilibrium. |
| Wt. gms | D5 | D5 | D5 | D5 | D5 | D5 | D5. |
|  |  | 251.6 |  |  | 251.6 |  |  |
| Coating: |  |  |  |  |  |  |  |
| Cycle |  | 1 | 2 | 3 | 1 | 2 | 3. |
| Catalyst |  | REX |  |  | REY |  |  |
| Type |  | PS24 |  |  | PSR24 |  |  |
| Wt. gms |  | 5 | 5 | 5 | 5 | 5 | 5. |
| Binder: |  |  |  |  |  |  |  |
| Type |  | Al | Al | Al | Al | Al | Al. |
| Wt. gms |  | 2.5 | 2.5 | 2.5 | 2.5 | 2.5 | 2.5. |
| Method |  | Tumble | Tumble | Tumble | Tumble | Tumble | Tumble. |
| Premix at low temp |  | 15 min |  |  | 15 min |  |  |
| Time |  | ½ hr | ½ hr | ½ hr | ½ hr | ½ hr | ½ hr. |
| Temp., deg. F |  | 1,250 | 1,250 | 1,250 | 1,250 | 1,250 | 1,250. |
| Coating Amount: |  |  |  |  |  |  |  |
| Catalyst, wt. percent | None | 1.2 | 1.6 | 2.18 | 1.06 | 1.78 | 2.68. |
| Binder, wt. percent |  | 0.6 | 0.8 | 1.09 | 1.03 | 0.89 | 1.34. |
| Catalytic Evaluation: |  |  |  |  |  |  |  |
| Space Velocity (LHSV) | 2 |  |  | 2 |  |  | 2. |
| Cat/Oil (v./v.) | 3 |  |  | 3 |  |  | 3. |
| Temp., deg. F | 900 |  |  | 900 |  |  | 900. |
| Conversion | 55.6 |  |  | 62.2 |  |  | 68.9. |
| $C_5+$ Gasoline (vol. percent) | 43.0 |  |  | 47.7 |  |  | 54.8. |
| Total $C_4$'s (vol. percent) | 14.0 |  |  | 14.9 |  |  | 15.1. |
| Dry Gas (wt. percent) | 6.3 |  |  | 6.6 |  |  | 6.8. |
| Coke (wt. percent) | 2.8 |  |  | 3.9 |  |  | 3.9. |
| Delta Advantage over Si/Al: |  |  |  |  |  |  |  |
| $C_5+$ Gasoline (vol. percent) | +2.8 |  |  | +4.1 |  |  | +8.0. |
| Total $C_4$'s (vol. percent) | −0.6 |  |  | −2.0 |  |  | −4.2. |
| Dry Gas (wt. percent) | −0.9 |  |  | −1.5 |  |  | −2.3. |
| Coke (wt. percent) | −0.9 |  |  | −0.9 |  |  | −2.1. |

Amount of coating determined by weight gain.

TABLE X

|  |  | Blank |
|---|---|---|
| Carrier Particle: |  |  |
| Type |  | Commercial Clay Catalyst |
| Composition | Clay | Clay. |
| Wt. gms |  | 187.5. |
| Coating: |  |  |
| Catalyst |  | REY. |
| Type |  | PSR24. |
| Wt. gms |  | 6.25. |
| Binder: |  |  |
| Type |  | BaSO₄. |
| Wt. gms |  | 3.12. |
| Method |  | Tumble. |
| Time |  | 2 hrs. |
| Temp., deg. F |  | 1,150. |
| Coating Amount: |  |  |
| Catalyst, wt. percent | None | 3.6. |
| Binder, wt. Percent |  | 1.9. |
| Catalytic Evaluation: |  |  |
| Space Velocity (LHSV) | 2 | 2. |
| Cat/Oil (v./v.) | 3 | 3. |
| Conversion | 46.4 | 67.5. |
| $C_5+$ Gasoline (vol. percent) | 34.9 | 54.0. |
| Total $C_4$'s (vol. percent) | 10.0 | 13.8. |
| Dry Gas (wt. percent) | 5.4 | 6.3. |
| Coke (wt. percent) | 4.2 | 4.8. |
| Delta Advantage over Si/Al: |  |  |
| $C_5+$ Gasoline (vol. percent) | +0.3 | +7.8 |
| Total $C_4$'s (vol. percent) | −1.5 | −5.0. |
| Dry Gas (wt. percent) | −0.5 | −2.6. |
| Coke (wt. percent) | +1.6 | −1.0. |

Experiment 20

That multiple layer coatings can be built up by repeated coating is shown in this experiment. In this way

Aging data

To establish that the coated material retained its value through numerous cycles of cracking, purging with steam, regeneration and purging, as in commercial operation, the following series of tests were conducted.

In these tests the carrier particles were commercial amorphous silica alumina beads containing a small amount of chromia, which had been subjected to cyclic reaction and regeneration until their activity had reached an equilibrium value, as described earlier herein.

Four coated materials were tested.

In all cases, the catalyst coating material was a rare earth exchanged X type faujasite, as described before, and in three cases it was steam treated for 24 hours, 15 p.s.i.g., 1200° F., 100% steam (PSR24). The fourth catalyst after washing and drying, was steamed for 24 hours, 100% steam, atmospheric pressure, (SR24), at 1300° F.

In these tests, coated carrier was subjected, cyclically, to cracking at 900° F., space velocity (LHSV) of 2, cat/oil ratio (v./v.) of 3,5 wt. percent of steam present with charge of a standard gas oil of Mid-Continent type, purged with steam at 900° F. after cracking, regenerated with a maximum temperature of 1150°–1175° F., and returned to cracking.

At intervals, after an indicated number of cycles, a portion of the catalyst was subjected to a standard activity test, at 900° F., space velocity (LHSV) of 2, cat./oil ratio (v./v.) of 3.0, and the conversion and gasoline producing capability determined. In all cases, the conversion values at start and sampling times were compared (Delta values), with those of a standard amorphous silica alumina bead catalyst.

Amounts of coating were determined by the washing procedure.

space velocity), gave much more conversion and gasoline than the standard conventional catalyst.

This Zirconia-silica amorphous catalyst was used to coat a conventional silica alumina amorphous bead catalyst containing a small amount of chromia, with the results shown in the following Table XIII.

TABLE XII.—AGING DATA

| Catalyst | Coating, Wt. percent | Cycles | Conv., Vol. percent | $C_5$+Gaso., Vol. percent | Delta [2] Si/Al |
|---|---|---|---|---|---|
| Blank | None | 0 | 45.2 | 32.6 | −1.3 |
| REX PSR24 with Al metal on above blank. | 1.23 | 0 | 52.9 | 41.0 | 2.5 |
| | 1.19 | 72 | 49.7 | 38.4 | 1.8 |
| | | 144 | 49.0 | 38.9 | 2.6 |
| | 0.775 | 219 | 48.1 | 38.0 | 2.3 |
| REX PSR24 with Al metal on above blank. | 1.32 | 0 | 55.1 | 42.4 | 2.5 |
| | | 72 | 53.4 | 41.8 | 2.9 |
| | [1] 1.38 | 144 | 52.0 | 40.2 | 2.2 |
| | [1] 1.48 | 219 | 52.7 | 40.8 | 2.3 |
| REX PSR24 with BaSO₄ on above blank. | 1.91 | 0 | 56.6 | 43.4 | 2.7 |
| | 1.67 | 72 | 53.9 | 43.0 | 2.9 |
| | 1.37 | 144 | 52.8 | 42.1 | 3.6 |
| | 1.05 | 219 | 54.3 | 43.5 | 3.9 |
| REX SR24 1300 with Al metal on above blank. | 1.15 | 0 | 52.6 | 39.8 | 1.4 |
| | | 72 | 49.7 | 38.0 | 1.4 |
| | 1.07 | 144 | 47.8 | 37.4 | 1.9 |
| | 1.02 | 219 | 49.1 | 39.5 | 3.2 |

[1] Within experimental error range.
[2] Delta means that, compared with a selected amorphous standard silica alumina catalyst, at the indicated conversion of 49.1, the tested material, with 39.5 gasoline, made 3.2 more gasoline.

Referring to the first coated material shown above, when first coated, it gave a gasoline producing ability almost twenty-five percent greater than the carrier which it rejuvenated, and after two hundred and nineteen cycles of cracking and regeneration, it retained almost sixty-five percent of the coating and still had a gasoline producing capability about fifteen percent greater than that carrier.

Superactive crystalline aluminosilicates are not the only form of superactive catalytic materials which may be utilized in this invention. For example a material which is superactive, as defined herein, is an amorphous $ZrO_2$–$SiO_2$ and it can be so used.

This superactive material is prepared, to contain 70% $ZrO_2$ and 30% $SiO_2$ by interacting $(EtO)_4Si$ and $ZrOCl \cdot 8H_2O$ in alcoholic solution at 160° F. for 24 hours and then adjusting the pH of the gel to 3.5 to 4 with $NH_4OH$. Following this adjustment the gel is washed free of chloride ion, oven dried for 20 hours at 275° F., calcined for 10 hours at 1000° F., and finally steamed for 20 hours with steam at 1225° F. and atmospheric pressure prior to catalytic evaluation.

To determine the catalytic activity of the catalyst, comparative runs were made against a commercial amorphous silica alumina catalyst, as shown below.

| | Si/Al | $ZrO_2$-$SiO_2$ |
|---|---|---|
| Conditions: | | |
| Liquid hourly space velocity | 16 | 32 |
| Cat/Oil ratio (v./v.) | 0.75 | 0.75 |
| Temperature, deg. F | 900 | 907 |
| Conversion (vol. percent) | 46.4 | 50.3 |
| $C_5$+gasoline (vol. percent) | 38.3 | 43.7 |
| Total $C_4$'s (vol. percent) | 11.0 | 9.4 |
| Dry Gas (wt. percent) | 4.4 | 3.9 |
| Coke (wt. percent) | 1.6 | 2.5 |

From the above it may be noted that the Zirconia-Silica catalyst, at one-half the exposure to catalyst (twice the

TABLE XIII

| | | Blank |
|---|---|---|
| Carrier Particle | Bead | Bead. |
| Composition | Si/Al | Si/Al. |
| Wt. gms | | 282. |
| Coating: | | |
| Catalyst | None | $ZrO_2$-$SiO_2$. |
| Type | | Steamed. |
| Wt. gms | | 5.0. |
| Binder: | | |
| Type | None | $BaSO_4$. |
| Wt. gms | | 2.5 |
| Method: | | |
| Time | | 30 min. |
| Temp., deg. F | | Room. |
| Time | | 45 min. |
| Temp., deg. F | | 1,000. |
| Coating amount: Catalyst, wt. percent | | 3.9. |
| After treatment | | Steam. |
| Time | | 20 hours. |
| Temp., deg. F | | 1,225. |
| Pressure | | Atmos. |
| Catalytic Evaluation: | | |
| Space velocity (LHSV) | 2 | 2. |
| Cat/Oil | 3 | 3. |
| Temp., deg. F | 900 | 900. |
| Conversion (vol. percent) | 36.6 | 39.9 |
| $C_5$+ gasoline (vol. percent) | 29.9 | 32.0 |
| Total $C_4$'s (vol. percent) | 8.1 | 9.0. |
| Dry Gas (wt. percent) | 4.1 | 4.8. |
| Coke (wt. percent) | 1.6 | 1.9. |

In utilization of this invention in commercial processes, the catalyst and binder may be applied as a precoating, or added at some point in a cyclic system.

In cyclic systems, appropriate points for addition are found at many points within the system, where circulating solids encounter adequate mixing conditions. For example, the powdered superactive material and binder may be added, continuously or at intervals, in desired quantities, to the carrier or carrier-catalyst emergent from the regeneration step, since subsequent catalyst transport systems supply turbulent mixing conditions. It is noted that even with a limited amount of turbulent mixing at proper temperatures a sufficient amount will adhere, when a binder is used, to enhance the capability of the catalyst in an operating system by a useful amount, when viewed from the commercial standpoint.

In summation, this invention is concerned with the utilization of such superactive materials as have at least about two times, and preferably three to five times as much capability for the cracking of gas oils as does an amorphous silica alumina material when utilized at the same conditions.

In particular, it is concerned with the utilization of superactive crystalline aluminosilicate materials, in which the alkali metal of the "salt" form has been largely replaced by cations of trivalent metals, of divalent metals to some extent in some cases, or by hydrogen, or by combinations thereof. Usually this replacement is followed by adjustment of activity to a useful level by steaming, high temperature calcining, and the like.

Catalytic materials of the general kind described are spoken of in the claims as superactive catalytic materials, and of the aluminosilicate variety are spoken of as superactive crystalline aluminosilicates.

It is further concerned with the use of the superactive catalysts in very fine form, substantially all passing through a 270 mesh U.S. Standard screen, and preferably all through a 325 mesh screen.

It is concerned with placing these fine superactive catalytic materials upon supports, such as particles, catalytically active or inert, including clays (catalytic or non-catalytic); catalysts, active, partially spent and spent, including composite catalysts comprising similar superactive materials in a matrix of inert material, or of clay, or of amorphous silica alumina complexes; or upon inerts, such as glass, pumice, blast furnace slags, ceramics, and the like. The particle size of the support may range from the rather large particles used in some fixed bed operations, through the "bead" sizes of ⅛-inch or so used in moving bed operations, down to the powders of 200 mesh size and less used in various fluidized processes.

To secure proper coating of the supporting carrier with the superactive catalytic material there is used a binder, of a particle size comparable to or smaller than that of the coating material. As binders there may be used clays, talc, boric acid, silica, rare earth oxides, some salts, barytes, and metals which fuse or soften at an appropriate temperature range, such as aluminum. Of these binders, a preference is had for barytes, for aluminum, and for clays.

Proper coating of the support is achieved by turbulent mixing, tumbling, or rolling together the superactive catalytic material, the support, and the binder, particularly at elevated temperatures of the order of 800° F. and above. The upper limit of such temperature of mixing is governed by the temperature stability of the catalyst, the fusing temperature of a metal binder, or the temperature at which a binder may itself decompose, or alter the chemical or physical nature of the other mix components. A temperature of about 1300° F. is a usual upper limit.

The invention may be used to make catalysts composites with inert carriers; to enhance the activity of catalytic particles such as clays, amorphous siliceous catalysts and the like; to enhance the activity of composite catalysts comprising superactive catalytic materials in a matrix; or to rejuvenate partially spent or spent catalysts of any of these kinds.

In such a framework, the invention may be applied in the conduct of any of the operations in which the superactive catalytic materials are useful, including many chemical transformations, and in particular the various conversions of hydrocarbons, including cracking, hydrocracking and reforming, of which the cracking operation is typical.

While certain exemplary preparations and procedures have been shown herein, it is to be understood that the invention is not limited thereto or thereby, but is only subject to limitations expressly set forth in the following claims.

We claim:

1. That method for increasing the activity of a hydrocarbon cracking catalyst of moderate activity which consists of:
   providing discrete particles of said catalyst of moderate activity
   and producing upon the surfaces of said discrete particles an adherent coating of superactive crystalline aluminosilicate catalytic material by
      admixing with the discrete particles dry powdered superactive crystalline aluminosilicate catalytic material and dry powdered binder material, both of which are of average sizes substantially less than about 40 microns and also substantially less than that of the discrete particles,
   and tumbling the dry mixture at elevated temperatures of from about 800° F. to about 1300° F.

2. The method of claim 1 in which the binder material is selected from the group consisting of barytes, clay, and powdered aluminum metal.

3. A composite catalytic material for hydrocarbon cracking consisting of
   discrete carrier particles possessed of moderate cracking ability
   and upon the surfaces of said carrier particles an adherent coating of superactive crystalline aluminosilicate catalytic material and an associated binder,
   said adherent coating being produced by
      admixing with the carirer particles dry powdered superactive crystalline aluminosilicate catalytic material and dry powdered binder material, both both of which are of average sizes substantially less than about 40 microns and also substantially less than that of the carrier particles,
   and tumbling the dry mixture at elevated temperatures of from about 800° F. to about 1300° F.

4. The composite catalytic material of claim 3 in which the binder material is selected from the group consisting of barytes, clays, and powdered aluminum metal.

References Cited

UNITED STATES PATENTS

| | | | |
|---|---|---|---|
| 2,323,728 | 7/1943 | Ruthruff | 212—457 |
| 3,039,953 | 6/1962 | Eng | 208—26 |
| 3,194,754 | 7/1965 | Fahnestock | 208—120 |

ABRAHAM RIMENS, *Primary Examiner.*

DELBERT E. GANTZ, *Examiner.*

UNITED STATES PATENT OFFICE
CERTIFICATE OF CORRECTION

Patent No. 3,368,981            February 13, 1968

Charles J. Plank et al.

It is certified that error appears in the above identified patent and that said Letters Patent are hereby corrected as shown below:

Column 10, TABLE VI, fourth column, line 5 thereof, for "PXR24" read -- PSR24 --; columns 13 and 14, TABLE XI, third column, line 7 thereof, for "PS24" read -- PSR24 --; column 16, TABLE XIII, first column, line 23 thereof, after "Cat/Oil" insert -- (v/v) --.

Signed and sealed this 15th day of July 1969.

(SEAL)
Attest:

Edward M. Fletcher, Jr.           WILLIAM E. SCHUYLER, JR.
Attesting Officer                     Commissioner of Patents